(12) United States Patent
Robison et al.

(10) Patent No.: US 12,303,813 B2
(45) Date of Patent: *May 20, 2025

(54) QUICK CHANGE OIL FILTER

(71) Applicant: DEERE & COMPANY, Moline, IL (US)

(72) Inventors: Jeremy P. Robison, Des Moines, IA (US); David W. Geiger, Raleigh, NC (US); John L. Bocksnick, Willow Spring, NC (US)

(73) Assignee: DEERE & COMPANY, Moline, IL (US)

( * ) Notice: Subject to any disclaimer, the term of this patent is extended or adjusted under 35 U.S.C. 154(b) by 479 days.

This patent is subject to a terminal disclaimer.

(21) Appl. No.: 17/660,759

(22) Filed: Apr. 26, 2022

(65) Prior Publication Data

US 2022/0249989 A1    Aug. 11, 2022

Related U.S. Application Data

(63) Continuation of application No. 15/078,165, filed on Mar. 23, 2016, now Pat. No. 11,351,488.

(51) Int. Cl.
*B01D 35/00* (2006.01)
*B01D 24/08* (2006.01)
(Continued)

(52) U.S. Cl.
CPC .......... *B01D 35/005* (2013.01); *B01D 24/08* (2013.01); *B01D 35/147* (2013.01);
(Continued)

(58) Field of Classification Search
CPC .. B01D 35/005; B01D 35/147; B01D 35/153; B01D 35/157; B01D 35/30;
(Continued)

(56) References Cited

U.S. PATENT DOCUMENTS 3,572,509 A    3/1971  Dexter
3,802,564 A    4/1974  Turman
(Continued)

FOREIGN PATENT DOCUMENTS

DE    4124323 A1    1/1993
DE    4243217 A1    6/1994
(Continued)

OTHER PUBLICATIONS

German Search Report issued in application No. DE102017204712.7 dated Apr. 24, 2023 (10 pages).

(Continued)

*Primary Examiner* — Akash K Varma

(57) ABSTRACT

A quick change oil filter incudes a filter canister and filter base that may be installed and removed manually from an engine adapter on an internal combustion engine. The filter canister and filter base may hold at least about one third of the required engine oil supply when removed from the engine adapter. The engine adapter includes an oil inlet passage, an oil outlet passage, and a filter base mounting cavity. A check valve is biased to close an oil outlet opening from the filter canister, trapping oil inside the filter canister when it is removed from the engine adapter.

4 Claims, 6 Drawing Sheets

(51) Int. Cl.
  *B01D 35/147* (2006.01)
  *B01D 35/153* (2006.01)
  *B01D 35/30* (2006.01)

(52) U.S. Cl.
  CPC ........... *B01D 35/153* (2013.01); *B01D 35/30* (2013.01); *B01D 35/306* (2013.01); *B01D 2201/304* (2013.01); *B01D 2201/316* (2013.01); *B01D 2201/34* (2013.01); *B01D 2201/4015* (2013.01); *B01D 2201/4023* (2013.01)

(58) Field of Classification Search
  CPC .. B01D 35/306; B01D 35/00; B01D 35/1573; B01D 35/14; B01D 35/143; B01D 24/08; B01D 2201/304; B01D 2201/316; B01D 2201/34; B01D 2201/4015; B01D 2201/4023; B01D 2201/306; B01D 27/106; B01D 27/108; B01D 27/08; B01D 27/10; B01D 21/24; F01M 11/03; F01M 1/00; F16N 33/00
  USPC ....... 210/136, 232, 248, 443, 238, 440, 444, 210/450, 453, 168, 435, 437, 441, 442, 210/452, 454, 109, 110, 130, 420, 134, 210/133, 439, 222
  See application file for complete search history.

(56) References Cited

U.S. PATENT DOCUMENTS

| | | | |
|---|---|---|---|
| 4,151,823 A | 5/1979 | Grosse et al. | |
| 4,297,212 A | 10/1981 | Padgett, Sr. | |
| 4,581,135 A | 4/1986 | Gerulis | |
| 5,070,831 A | 12/1991 | Yunick | |
| 5,246,086 A | 9/1993 | Yunick | |
| 5,300,223 A * | 4/1994 | Wright | B01D 35/14 |
| | | | 210/232 |
| 5,454,354 A | 10/1995 | Miller | |
| 5,605,624 A * | 2/1997 | Wright | B01D 29/21 |
| | | | 210/453 |
| 6,685,829 B1 | 2/2004 | Baumann et al. | |
| 6,966,986 B1 | 11/2005 | Lackey | |
| 7,018,531 B2 | 3/2006 | Eilers et al. | |
| 7,850,755 B2 | 12/2010 | Krull et al. | |
| 2002/0030007 A1 | 3/2002 | Koh | |
| 2003/0102268 A1 | 6/2003 | Prater et al. | |
| 2004/0035766 A1 * | 2/2004 | Wright | B01D 29/96 |
| | | | 210/136 |
| 2015/0337695 A1 | 11/2015 | Ardes | |

FOREIGN PATENT DOCUMENTS

| | | |
|---|---|---|
| DE | 202014104029 U1 | 10/2014 |
| JP | H11104410 A | 4/1999 |

OTHER PUBLICATIONS

Great Britain Combined Search Report/Examination Report issued in Patent Application No. GB2200145.7, dated May 12, 2022, in 05 pages.

Chinese office action issued in counterpart application No. 201710033498.5 dated Jun. 29, 2020 (08 pages).

GB Search Report issued in counterpart application No. GB1702639.4 dated Aug. 29, 2017, 4 pages.

* cited by examiner

QUICK CHANGE OIL FILTER

This application is a continuation of U.S. patent application Ser. No. 15/078,165 filed Mar. 23, 2016. The parent application is incorporated herein in entirety by reference.

FIELD OF THE INVENTION

This invention relates to lubrication systems for internal combustion engines, and more specifically to a quick change oil filter for internal combustion engines on grass mowing equipment and off road vehicles.

BACKGROUND OF THE INVENTION

Engine oil changes for internal combustion engines on grass mowing equipment and off road vehicles typically require removing a drain plug and draining the used oil into a catch basin, transferring the oil to another container for disposal or recycling, and removing and replacing the oil filter. Each step may result in oil spillage and clean up, and also may require disposal of empty oil containers. Because of these difficulties, some owners of grass mowing equipment or off road vehicles may not change engine oil as often as needed.

A quick change oil filter for small internal combustion engines is needed that does not require removing a drain plug or using a catch basin, does not require another container for disposal or recycling, and does not require tools for removing and replacing the oil filter. A quick change oil filter is needed that minimizes or eliminates oil spillage and clean up, and does not require disposal of empty oil containers. A quick change oil filter is needed that simplifies and expedites oil changes by owners of grass mowing equipment or off road vehicles.

SUMMARY OF THE INVENTION

A quick change oil filter includes a filter canister and a filter base attached thereto for installing on an internal combustion engine. A check valve may be positioned in the filter base that closes an oil outlet passage from the filter canister when the filter canister and the filter base are removed from the engine. The filter canister may hold at least about one third of the required engine oil supply when removed from the engine.

The quick change oil filter does not require removing a drain plug or using a catch basin, does not require another container for disposal or recycling, and does not require tools for removing and replacing the oil filter. The quick change oil filter also minimizes or eliminates oil spillage and clean up, and does not require disposal of empty oil containers. The quick change oil filter simplifies oil changes by owners of grass mowing equipment or off road vehicles.

DESCRIPTION OF THE PREFERRED EMBODIMENT

Figure 1:
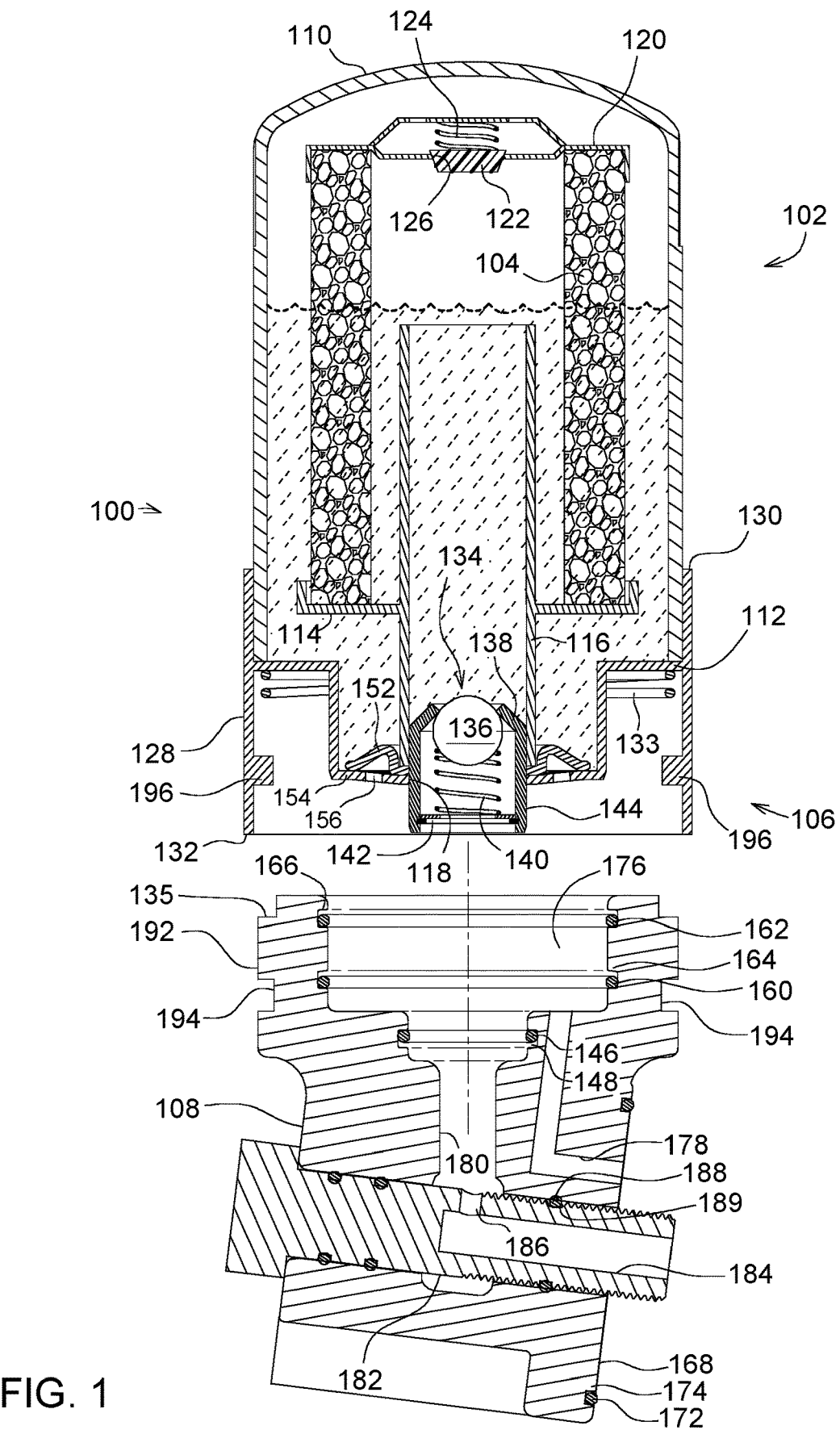
FIG. 1 is a side cross section view of a quick change oil filter with the filter canister and base removed from the engine adapter according to a first embodiment of the invention.
Figure 2:
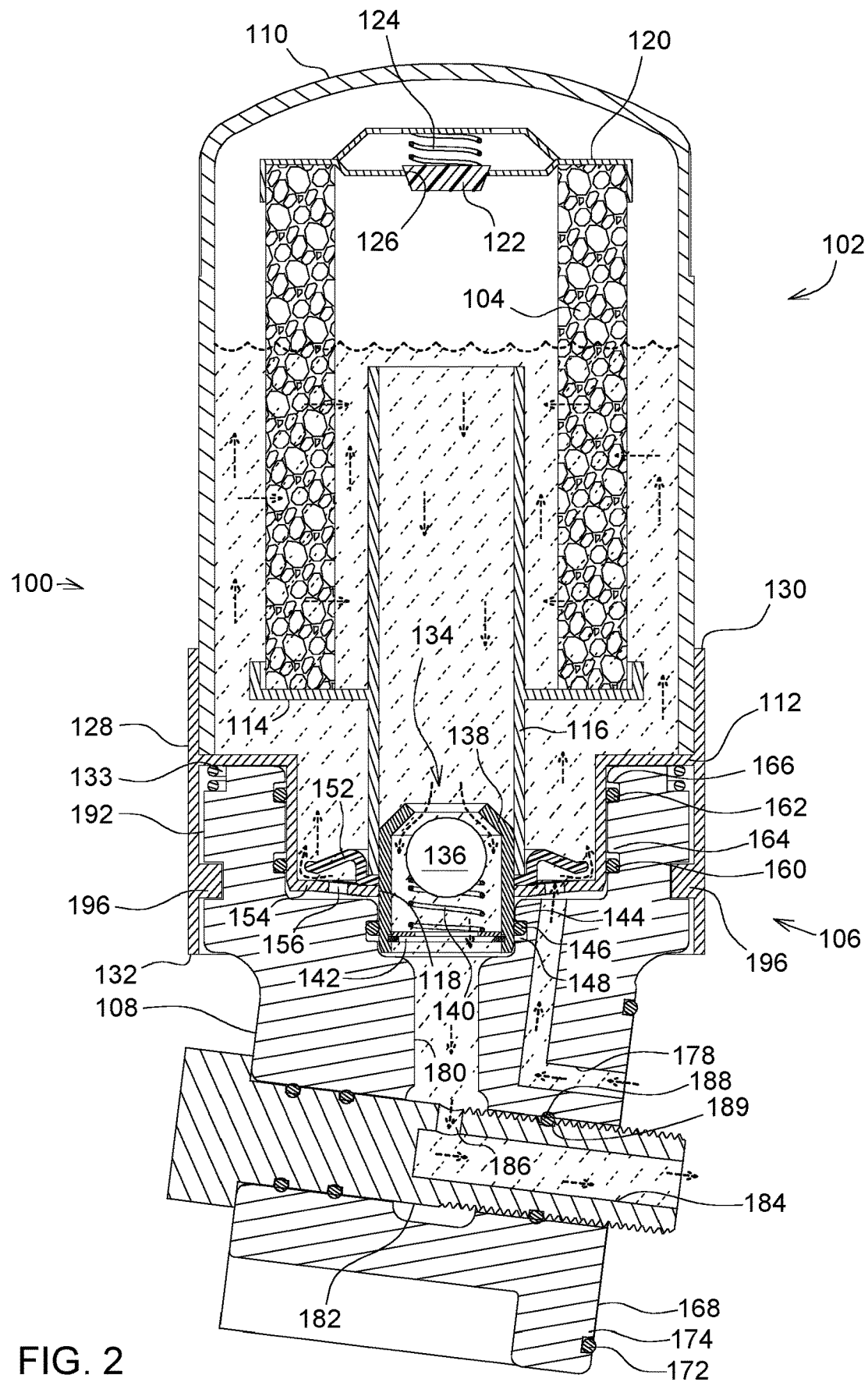
FIG. 2 is a side cross section view of a quick change oil filter with the filter canister and base installed on the engine adapter according to a first embodiment of the invention.
Figure 3:
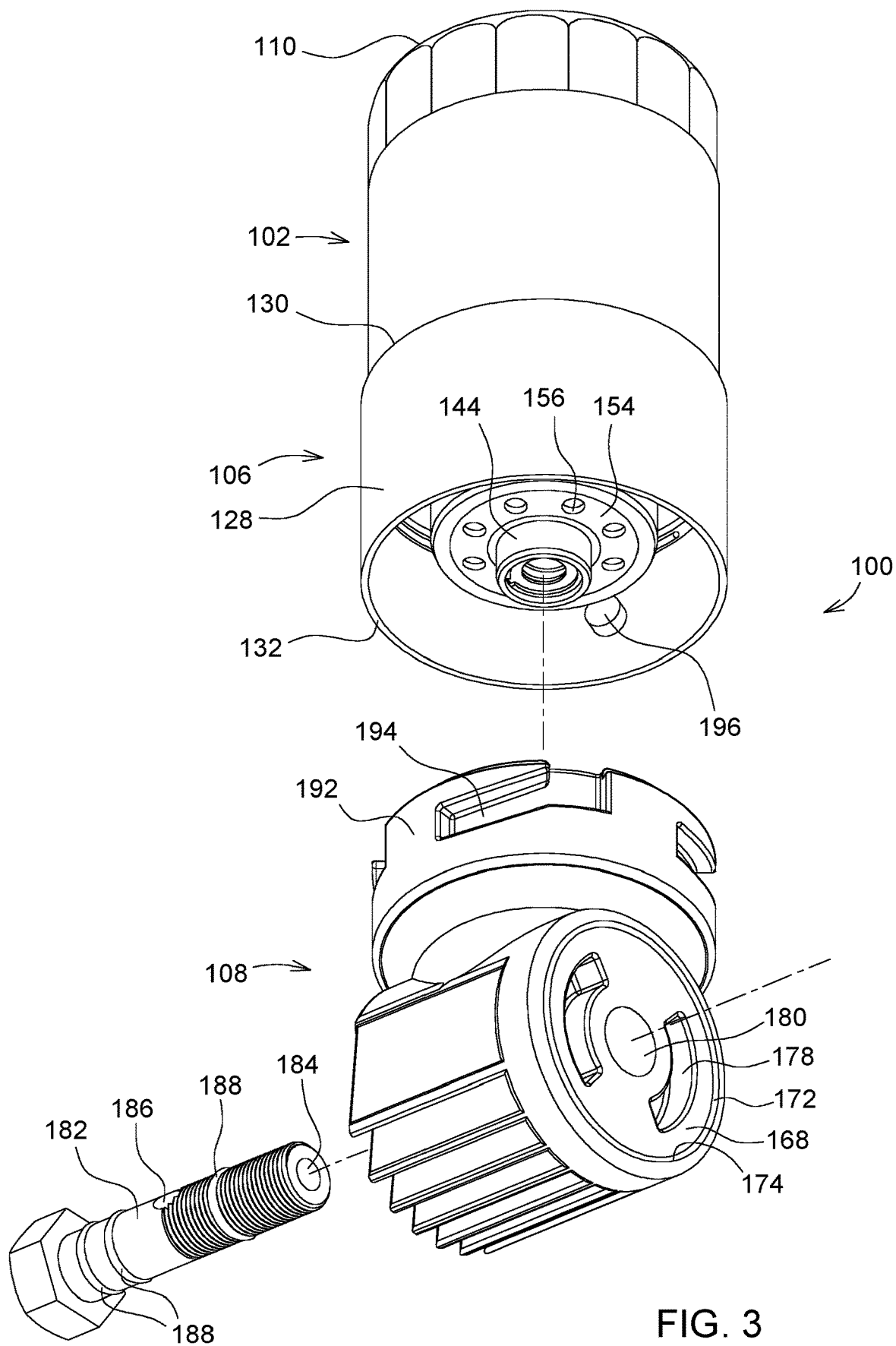
FIG. 3 is a perspective view of quick change oil filter including the filter canister and base, engine adapter and cartridge valve according to a first embodiment of the invention.

FIGS. 1-3 show a first embodiment of quick change oil filter 100. The quick change oil filter may be used on an internal combustion engine for grass mowing equipment such as lawn tractors or zero turn mowers, or off road equipment such as small tractors, all-terrain vehicles or utility vehicles. Quick change oil filter 100 may include filter canister 102 containing filter element 104, and filter base 106 connected to the filter canister. The quick change oil filter and base may be installed and removed from an engine adapter 108 mounted to the engine, or to an engine adapter that is part of the engine block. The filter canister may hold at least about 20 fluid ounces, or at least about one third of the specified engine oil volume, when the filter canister and base are removed from the engine adapter.

In one embodiment, the quick change oil filter may include a filter canister and base that are secured together so they may be installed and removed as a unit from the engine adapter without the use of tools. The filter base may have inlet and outlet seals and/or valves that open to allow oil to enter and exit the filter canister when installed on the engine adapter, as shown in FIG. 2. The inlet and outlet seals and/or valves close to prevent oil from entering or exiting the filter canister when removed from the engine adapter, as shown in FIG. 1. After the filter canister and base are removed, another filter canister and base may be installed on the engine adapter, containing a volume of replacement oil that is at least about one third of the specified engine oil volume.

In a first embodiment, filter canister 102 may be a generally cylindrical hollow structure having first end 110 and second end 112. The first end of the filter canister may be closed, and the second end may be secured to filter base 106. The filter canister may enclose and house filter element 104. The filter element may be a sleeve shaped paper filter, or other media filter, and may be supported on one end by filter element support 114. The filter element support may include support tube 116 connected to oil outlet opening 118 in the filter base. Oil may be filtered by passing through the filter element, from the outside to the inside of filter element, and the filtered oil may exit the filter element through the support tube. Support tube 116 may extend into the filter element, and preferably may have a length more than about one half the length of the filter element. The support tube may assure a specified oil level in the filter canister, such at least about one third of the required engine oil volume, because the oil level must reach the top of the support tube before it can exit the filter canister. The filter element may be closed on the top end with end cap 120. The filter element also may have a bypass or relief valve 122. The bypass valve may be biased by spring 124 to a closed position, and may open if there is high pressure inside the filter element, such as 12 psi, indicating the filter element is plugged. The bypass valve may be positioned in opening 126 in end cap 120.

In a first embodiment, filter base 106 may include protective flange 128 having first end 130 and second end 132. The protective flange may extend past the second end of the filter canister, and may cover the outer perimeter of the filter canister, and may be secured and sealed to the filter canister with adhesive or other means. The protective flange also may allow the filter canister and base to be easily installed and removed from the engine adapter without tools, and may extend past and cover the outer perimeter of the first end of engine adapter. For example, the second end of the protective flange may include one or more retaining features 196 to lock the filter canister and base to the engine adapter when installed as shown in FIG. 2, and spring 133 which may engage shoulder 135 on the engine adapter to help secure it to the engine adapter.

In a first embodiment, filter base 106 may include pressure responsive check valve 134 that may be biased to a closed or sealed position as shown in FIG. 1. Thus, when the filter canister and base are removed from the engine adapter, the check valve may be biased to a closed position to trap oil inside the filter canister, and prevent oil in the filter canister from exiting or leaking out through oil outlet opening 118 in the filter base. For example, the check valve may include ball 136 that seals with a seat in valve housing 138, and spring 140 positioned in the valve housing between the ball and retainer 142, biasing the check valve ball toward the closed or sealed position. The valve housing may have outer cylindrical surface 144 that may engage at least one outlet surface seal in the engine adapter, preferably radial O-ring seal 146 positioned in groove 148. As shown in FIG. 2, when the filter canister and base are installed on the engine adapter, the check valve may open in response to oil pressure inside the filter element, allowing oil to exit the filter canister through support tube 116 and into oil outlet passage 180 in the engine adapter. For example, the check valve may open in response to oil pressure that exceeds about 3 psi, substantially below the specified oil pressure.

In a first embodiment, filter base 106 may include pressure responsive flowback seal 152 positioned inside the filter base over inlet openings 156 through inlet surface 154. For example, the flowback seal may be a flexible ring-shaped rubber seal that allows oil to enter but not exit the filter canister. As shown in FIG. 2, the flowback seal may open to allow oil from oil inlet passages 178 in the engine adapter to flow through inlet openings 156 in the filter base and into the filter canister outside the filter element. As shown in FIG. 1, the flowback seal may be closed to prevent oil from exiting the filter canister through the inlet openings when removed from the engine adapter.

In a first embodiment, quick change oil filter 100 may include engine adapter 108 mounted to the engine block adjacent the oil sump. The engine adapter may have an engine mounting surface 168 that seals with a standard spin-on oil filter base on the engine block. For example, the engine mounting surface of the engine adapter may include O-ring 172 positioned in groove 174 located in the face of the engine mounting surface. To attach and secure the engine adapter to the engine block, cartridge valve 182 may be inserted through the engine adapter and threaded to an opening in the engine mounting surface of the engine block. Alternatively, the engine adapter may not be attached and secured to the engine block, but may be integrally cast or formed as part of the engine block itself.

In a first embodiment, the engine adapter may include filter base mounting cavity 176 where the filter base may be installed. The filter base mounting cavity may have one or more internal steps that may receive and engage the filter base. The engine adapter may have one or more oil inlet passages 178 and an oil outlet passage 180 that may open to the filter base mounting cavity. O-ring seal 146 may be provided in groove 148 in the filter base mounting cavity to provide a seal with the check valve housing 144. O-ring seals 160, 162 may be provided in grooves 164, 166 to seal with the filter base adjacent the oil inlet passages. Alternatively, one or more face seals may be provided in the filter base mounting cavity of the engine adapter to seal with the filter base.

In a first embodiment, the engine adapter may include filter retaining features. For example, the engine adapter may have a cylindrical outer body 192 with retention slots 194 that may be engaged by protrusions 196 extending radially inwardly from the protective flange of the filter base. Preferably, each retention slot 194 may extend not more than about 45 degrees around the circumference of the engine adapter. The filter canister and base may be installed on the engine adapter without the use of tools by rotating the filter base not more than about 45 degrees (i.e., a quarter turn) so that the O-ring seals in the engine adapter may be in sealing engagement with the filter base. During installation, spring 133 may be compressed against shoulder 135. Alternatively, the engine adapter and filter base may use other mechanical retaining features that facilitate manual installation and removal without tools. For example, the filter base may include one or more outwardly extending features that are retained in slots or channels in the engine adapter.

In a first embodiment, engine adapter 108 may include one or more oil inlet passages 178 between the engine mounting surface and the filter base mounting cavity. The engine adapter also may have oil outlet passage 180 between the engine mounting surface and the filter base mounting cavity. FIG. 2 illustrates the flow of oil through the quick change filter when it is installed. As shown in FIG. 2, when the filter canister and base are installed on the engine adapter, oil from the engine sump may enter oil inlet passages 178 in the engine adapter, through inlet openings 156 and past flowback seal 152 into the filter canister outside the filter element. Oil may be filtered by passing through the filter element, then flow from the inside of the filter element into support tube 116, past check valve 134, and through oil outlet passage 180 in the engine adapter back to the engine sump.

In a first embodiment, quick change oil filter 100 may include cartridge valve 182 that may extend through oil outlet passage 180 in the engine adapter. The cartridge valve may be threaded to engage oil outlet passage 180 and an opening in the engine mounting surface. The cartridge valve may have a longitudinal passage 184 connected to a radial passage 186. The cartridge valve may be rotated sufficiently to retract it from a fully inserted position. O-ring seals 188 may be provided in grooves 189 to prevent leakage from the oil outlet passage.

Figure 4:
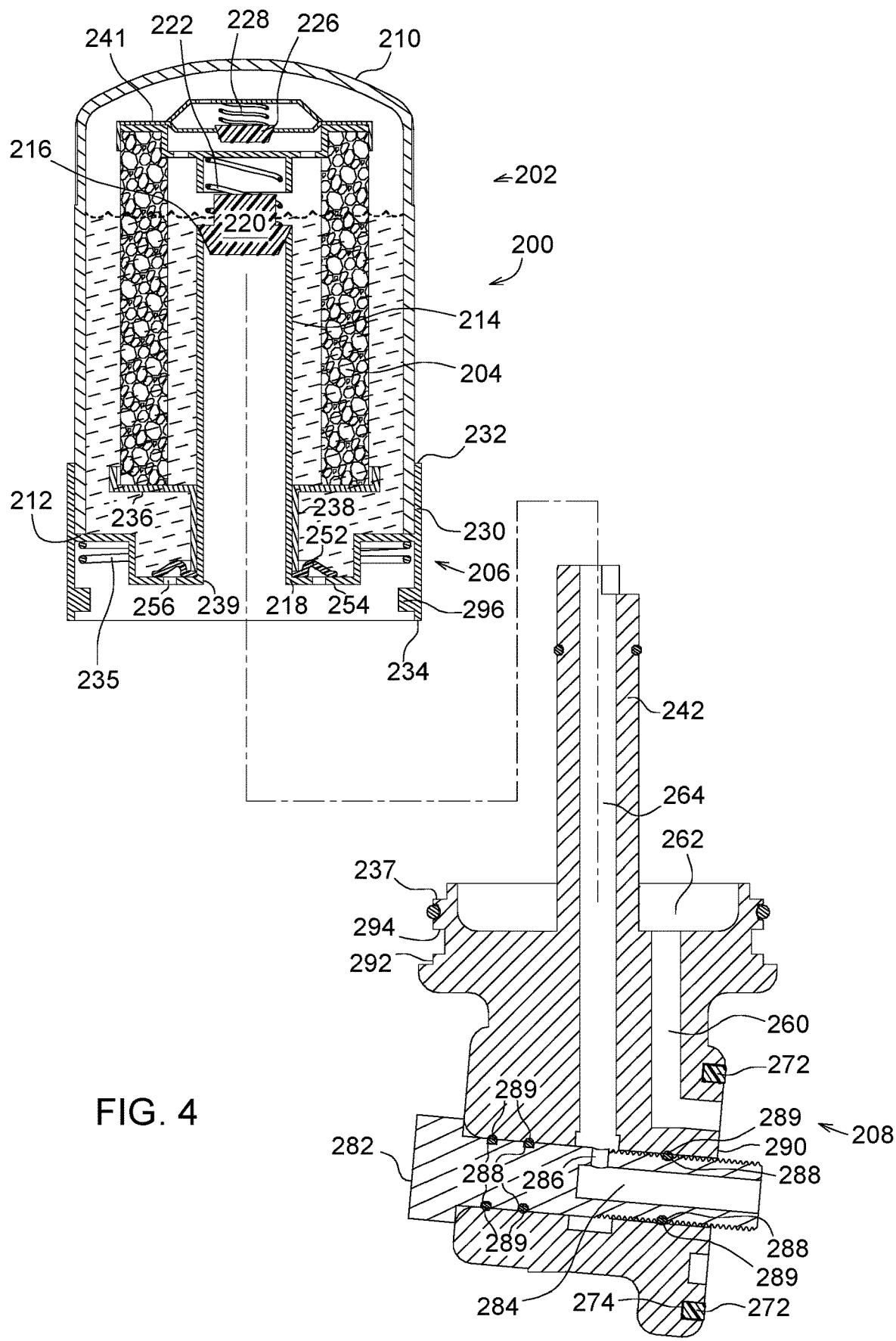
FIG. 4 is a side cross section view of quick change oil filter with the filter canister and base removed from the engine adapter according to a second embodiment of the invention.
Figure 5:
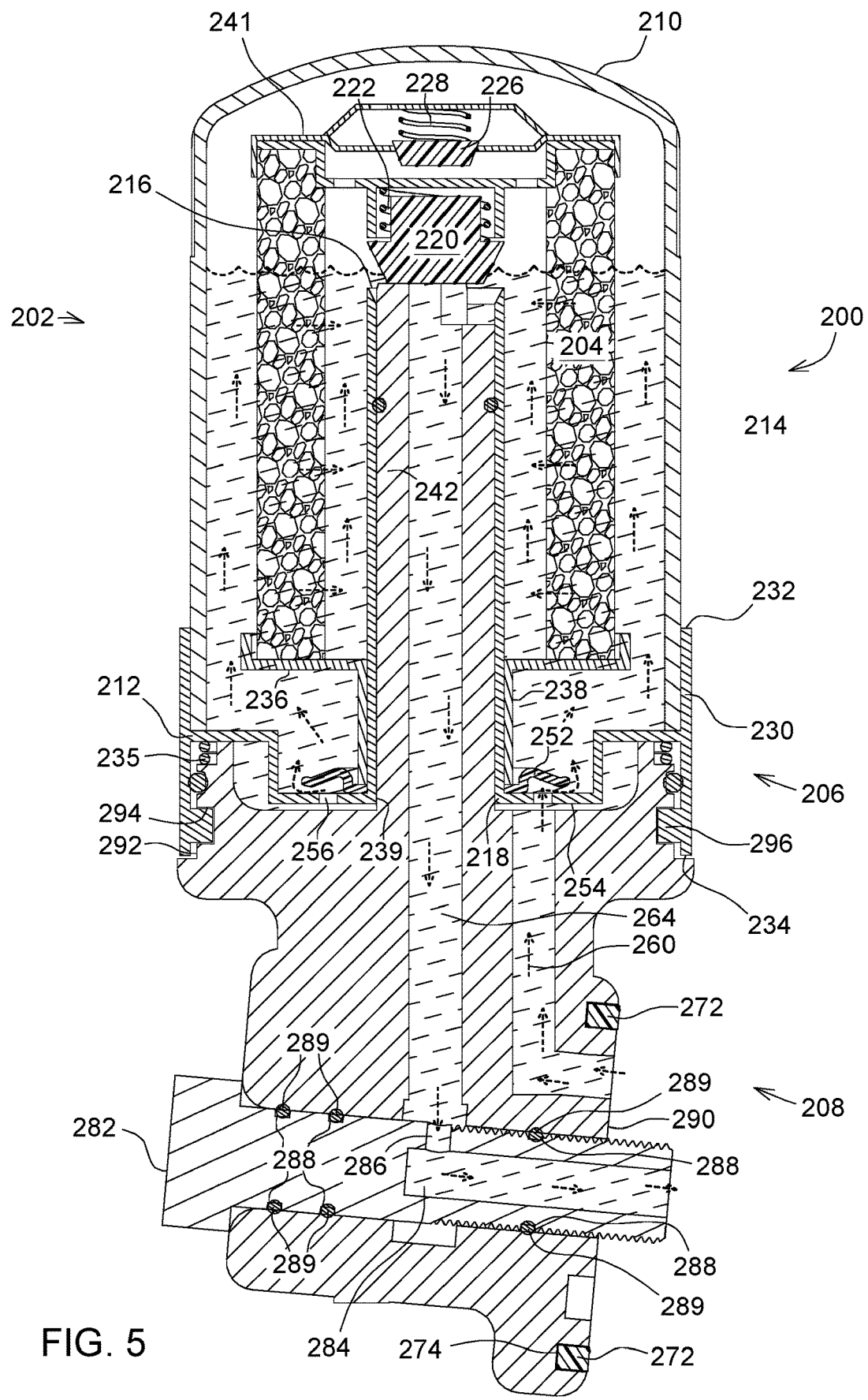
FIG. 5 is a side cross section view of quick change oil filter with the filter canister and base installed on the engine adapter according to a second embodiment of the invention.
Figure 6:
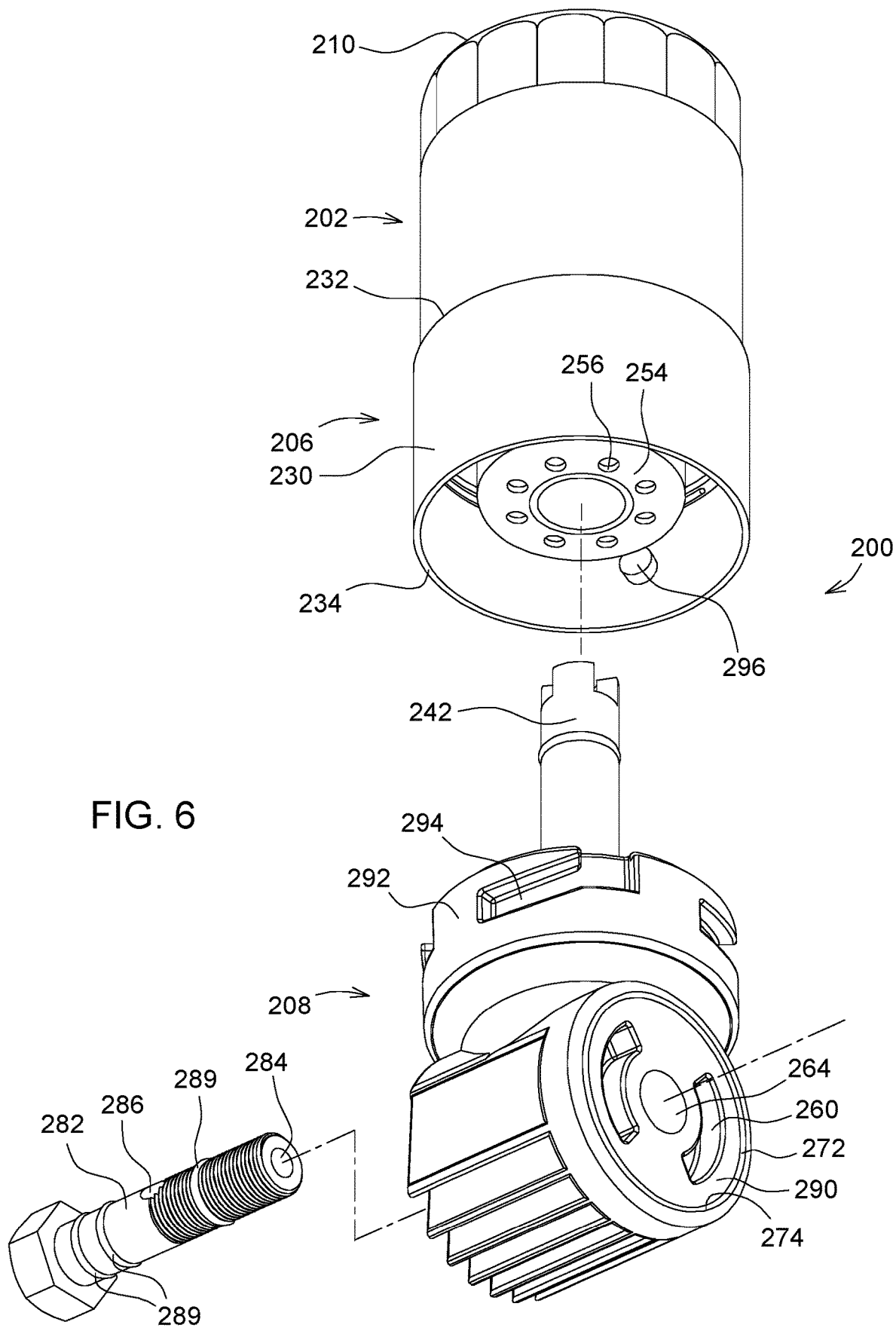
FIG. 6 is a perspective view of a quick change oil filter including the filter canister and base, engine adapter and cartridge valve according to a second embodiment of the invention.

FIGS. 4-6 show a second embodiment of quick change oil filter 200, including filter canister 202 containing filter element 204, filter base 206 attached to the filter canister, and engine adapter 208 which may be mounted to an engine. The filter canister may have an internal volume sufficient to hold at least about one third of the required engine oil supply when the filter canister and base are off the engine adapter, as shown in FIG. 4. The filter canister and filter base may be secured together and may be installed and removed as a unit from the engine adapter without the use of tools. The quick change oil filter may include seals and/or valves that prevent oil leakage when the filter canister and base are removed from the engine adapter. Another filter canister and base then may be installed on the engine adapter, containing substantially the same volume of replacement oil.

In a second embodiment, filter canister 202 may be a generally cylindrical hollow structure having first end 210 and second end 212. The first end of the filter canister may be closed, and the second end may be secured to filter base 206. The filter canister may enclose and house filter element 204. The filter element may be a sleeve shaped paper (or other media) filter and may be supported on one end by filter element support 236. The filter element support may include support tube 238 connected to opening 239 in the filter base. The filter element may be closed on the upper end with end cap 241. The filter element also may have bypass or relief valve 226. The bypass valve may be biased by spring 228 to a closed position, and may open if high pressure in the filter element, such as 12 psi, indicates the filter is plugged.

In a second embodiment, filter base 206 may include oil outlet tube 214 having a first or upper end 216 located inside the filter element, and a second or lower end 218 positioned at or adjacent opening 239 of the filter canister. Oil outlet tube 214 may extend through support tube 238 and into the filter element, and preferably may have a length more than about one half the length of the filter element. Oil outlet tube 214 may assure a specified oil level in the filter canister, such at least about one third of the required engine oil volume, because the oil level must reach the top of the oil outlet tube before it can exit the filter canister. Check valve 220 may be biased by spring 222 to close the first or upper end of oil outlet tube 214. As shown in FIG. 4, when the filter canister and base are removed from the engine adapter, the check valve closes the first or upper end of oil outlet tube 214 to trap the oil inside the canister. As shown in FIG. 5, when the filter canister and base are installed on the engine adapter, stand pipe 242, which extends from the engine adapter, may push the check valve up and off the second or upper end of oil outlet tube 214. Opening the second or upper end of the oil outlet tube, filtered oil may flow out of the filter canister into oil outlet passage 264.

In a second embodiment, filter base 206 may include protective flange 230 having first end 232 that may extend past the second end and cover the outer perimeter of the filter canister, and may be secured and sealed to the filter canister with adhesive or other means. A second end 234 of the protective flange may extend past the first end of the engine adapter, may be installed and removed from the engine adapter, and may have one or more retaining features to lock the filter canister and base to the engine adapter when it is installed.

In a second embodiment, engine adapter 208 may include one or more oil inlet passages 260 between engine mounting surface 290 and filter base mounting cavity 262. The engine adapter may include oil outlet passage 264 which may extend from the engine mounting surface through standpipe 242. The oil outlet passage may be centrally positioned in the engine adapter and the inlet passages may be spaced radially outwardly from the oil outlet passage. FIG. 5 illustrates the flow of oil when the quick change filter is installed. As shown in FIG. 5, when the filter canister and base are installed on the engine adapter, oil from the engine sump may enter oil inlet passages 260 in the engine adapter, through inlet openings 256 and past flowback seal 252, and into the filter canister outside the filter element. Oil that is filtered through the filter element may enter oil outlet passage 264 in standpipe 242, and continue through the oil outlet passage in the engine adapter back to the engine oil sump.

In a second embodiment, flowback seal 252 may be positioned inside the filter base on inlet surface 254 with inlet openings 256. The flowback seal may be a flexible ring-shaped rubber seal that allows oil from oil inlet passages 260 in the engine adapter to flow through inlet openings 256 in the filter base and into the filter canister outside the filter element, and may prevent oil from exiting the filter canister through the inlet openings.

In a second embodiment, quick change oil filter 200 may include engine adapter 208 secured to the engine. The engine adapter may have an engine mounting surface 290 that seals with a standard spin-on oil filter base on the engine. For example, the engine mounting surface of the engine adapter may include O-ring 272 positioned in groove 274 located in the face of the engine mounting surface. To attach and secure the engine adapter to the engine block, cartridge valve 282 may be inserted through the engine adapter and threaded to an opening in the engine mounting surface of the engine block. Alternatively, the engine adapter may not be attached and secured to the engine block, but may be integrally cast or formed as part of the engine block itself.

In a second embodiment, the engine adapter may include filter base mounting cavity 262 where the filter base may be positioned. O-ring seals may be provided in grooves to seal with the filter base adjacent the oil inlet passages. Alternatively, one or more face seals may be provided in the filter base mounting cavity of the engine adapter to seal with the filter base.

In a second embodiment, the engine adapter may include filter retaining features. For example, the engine adapter may have a cylindrical outer body 292 with slots 294 that may be engaged by protrusions 296 in the protective flange of the filter base. Preferably, each retention slot 294 may extend not more than about 45 degrees around the circumference of the filter base. Spring 235 may be positioned on the filter base and may engage shoulder 237 on the engine adapter. The filter canister and base may be fully engaged to the engine adapter by compressing the spring while rotating the filter base not more than about 45 degrees (i.e., a quarter turn) so that the O-ring seals in the engine adapter may be in sealing engagement with the filter base. The engine adapter and filter base also may use other mechanical retaining features that provide quick and easy installation and removal.

In a second embodiment, quick change oil filter 200 may include cartridge valve 282 that may open and close oil outlet passage 264 in the engine adapter. The cartridge valve may be selectively used to seal and prevent oil from exiting the engine through the engine adapter. The cartridge valve may have a longitudinal passage 284 and a radial passage 286. The cartridge valve may be threaded to oil outlet passage 264, and may be rotated sufficiently to retract it from a fully inserted position to block the radial passage. To seal the oil flow through the cartridge valve, O-ring seals 288 may be provided in grooves 289 on each side of the radial passage.

Having described the preferred embodiment, it will become apparent that various modifications can be made without departing from the scope of the invention as defined in the accompanying claims.

The invention claimed is:
1. A quick change oil filter, comprising:
 a filter canister and a filter base attached thereto and rotatably engaged on an internal combustion engine;

an oil outlet tube extending partially through an inside of a filter element in the filter canister to control an oil depth inside the filter canister; and a check valve positioned at a bottom end of the oil outlet tube that is pushed open when the filter canister and the filter base are engaged on the internal combustion engine, and closed trapping oil inside the filter canister up to a top end of the oil outlet tube when the filter canister and the filter base are rotatably removed from the internal combustion engine.

2. The quick change oil filter of claim 1, further comprising an engine adapter mounted to the internal combustion engine and the engine adapter having a plurality of oil inlet passages positioned radially outwardly from the oil outlet tube.

3. The quick change oil filter of claim 1, further comprising a stand pipe extending from an engine adapter and into the filter canister when the filter canister and the filter base are engaged on the engine adapter; the stand pipe pushing the check valve open.

4. The quick change oil filter of claim 1, further comprising a flowback seal positioned in the filter base, the flowback seal being a flexible ring-shaped rubber seal that closes a plurality of oil inlet passages into the filter canister when the filter canister and the filter base are rotatably removed from an engine adapter.

* * * * *